US008639131B2

(12) United States Patent
Peng et al.

(10) Patent No.: US 8,639,131 B2
(45) Date of Patent: Jan. 28, 2014

(54) BELT DRIVE APPARATUS AND IMAGE FORMING APPARATUS

(75) Inventors: Youbao Peng, Hino (JP); Satoshi Ogata, Hachioji (JP); Takashi Nara, Hachioji (JP); Tadashi Matsudaira, Hachioji (JP); Akihiro Hayashi, Okazaki (JP); Eiji Nishikawa, Tachikawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 662 days.

(21) Appl. No.: 12/957,711

(22) Filed: Dec. 1, 2010

(65) Prior Publication Data

US 2011/0135324 A1 Jun. 9, 2011

(30) Foreign Application Priority Data

Dec. 7, 2009 (JP) ................................. 2009-277741

(51) Int. Cl.

*G03G 15/20* (2006.01)
*B65G 43/00* (2006.01)
*F16H 7/22* (2006.01)

(52) U.S. Cl.

USPC ......... 399/33; 399/329; 198/810.03; 474/122

(58) Field of Classification Search

USPC ......... 399/33, 36, 66, 67, 165, 302, 303, 308, 399/313, 329; 219/216; 198/810.01, 198/810.03; 474/102, 119, 122, 123

See application file for complete search history.

(56) References Cited

U.S. PATENT DOCUMENTS

| | | | | |
|---|---|---|---|---|
| 6,141,526 | A * | 10/2000 | Ikeda | 399/395 |
| 6,871,036 | B2 * | 3/2005 | Asuwa et al. | 399/302 |
| 7,522,870 | B2 * | 4/2009 | Fujino | 399/329 |
| 8,081,892 | B2 * | 12/2011 | Taki et al. | 399/66 |
| 2008/0056778 | A1 * | 3/2008 | Tao et al. | 399/302 |
| 2008/0267673 | A1 * | 10/2008 | Tao et al. | 399/302 |

FOREIGN PATENT DOCUMENTS

| | | |
|---|---|---|
| JP | 2000-34031 | 2/2000 |
| JP | 2006154215 A * | 6/2006 |
| JP | 2008052030 A * | 3/2008 |

OTHER PUBLICATIONS

Japanese Office Action in corresponding Japanese Application No. 2009-277741 mailed Jun. 4, 2013.

* cited by examiner

*Primary Examiner* — Robert Beatty
(74) *Attorney, Agent, or Firm* — Finnegan, Henderson, Farabow, Garrett & Dunner, L.L.P.

(57) ABSTRACT

A belt drive apparatus, including, an endless belt to be laid across in a tensioned condition between supporting rollers and to travel being in pressure contact with or being separated from a body to receive the pressure contact, a pressure contact/separating state detection section to detect whether the endless belt is in the pressure contact with the body or separated therefrom, a belt position detection section to detect a position of the endless belt in a width direction thereof, a belt abnormality judging section to judge whether the endless belt is in an abnormal position based on a detection result obtained by the belt position detection section and one of judgment values which are set correspondingly to the pressure contact/separating state of the endless belt, and a belt drive control section to control a drive of the endless belt.

12 Claims, 8 Drawing Sheets

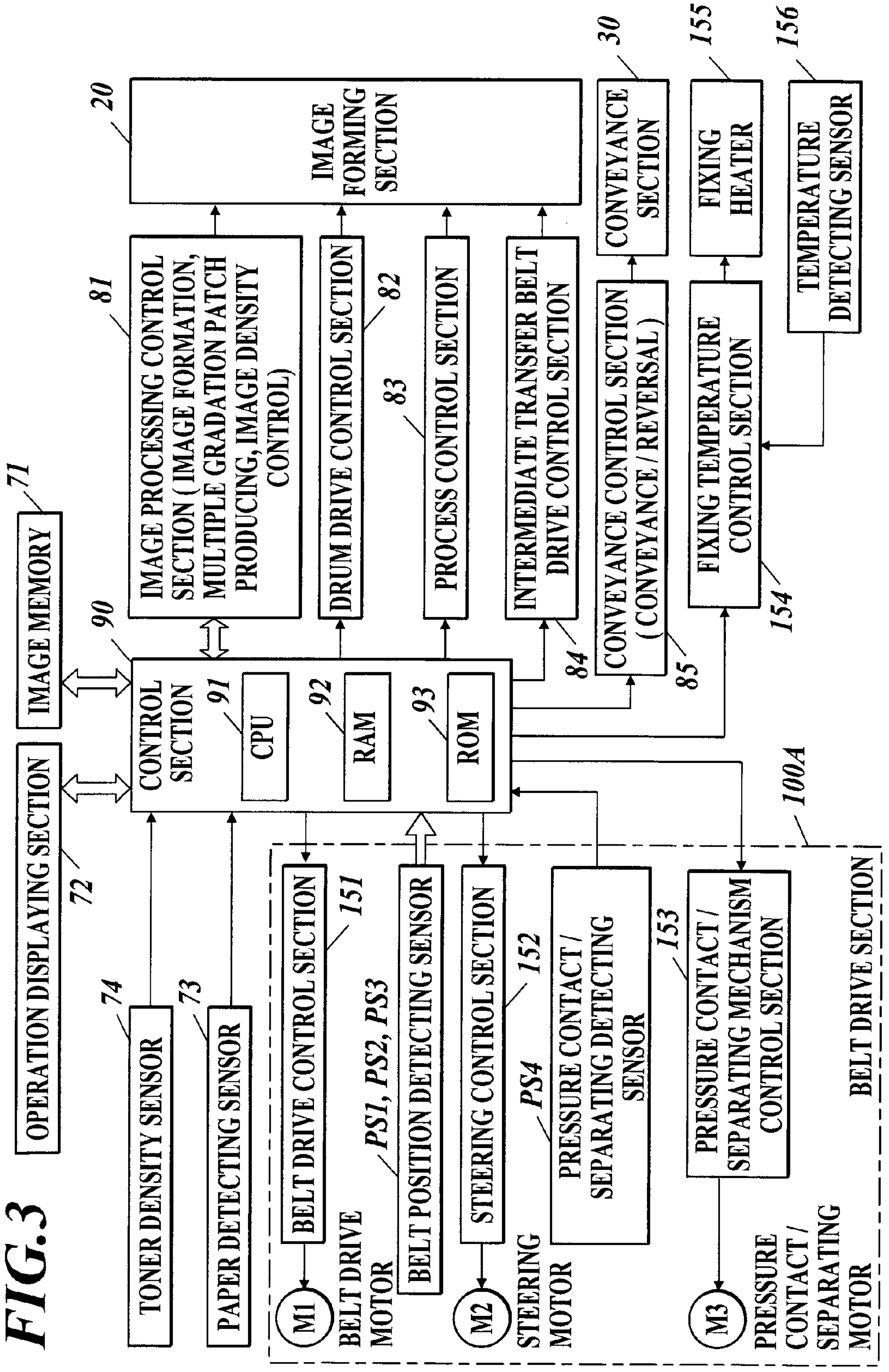
FIG.3
OPERATION DISPLAYING SECTION
72
IMAGE MEMORY
71
TONER DENSITY SENSOR
74
PAPER DETECTING SENSOR
73
CONTROL SECTION
90
CPU
91
RAM
92
ROM
93
IMAGE PROCESSING CONTROL SECTION ( IMAGE FORMATION, MULTIPLE GRADATION PATCH PRODUCING, IMAGE DENSITY CONTROL)
81
DRUM DRIVE CONTROL SECTION
82
PROCESS CONTROL SECTION
83
INTERMEDIATE TRANSFER BELT DRIVE CONTROL SECTION
84
CONVEYANCE CONTROL SECTION ( CONVEYANCE / REVERSAL )
85
FIXING TEMPERATURE CONTROL SECTION
154
IMAGE FORMING SECTION
20
CONVEYANCE SECTION
30
FIXING HEATER
155
TEMPERATURE DETECTING SENSOR
156
100A
BELT DRIVE CONTROL SECTION
151
PS1, PS2, PS3
BELT POSITION DETECTING SENSOR
STEERING CONTROL SECTION
152
PS4
PRESSURE CONTACT / SEPARATING DETECTING SENSOR
PRESSURE CONTACT / SEPARATING MECHANISM CONTROL SECTION
153
BELT DRIVE SECTION
M1
BELT DRIVE MOTOR
M2
STEERING MOTOR
M3
PRESSURE CONTACT / SEPARATING MOTOR

BELT DRIVE APPARATUS AND IMAGE FORMING APPARATUS

BACKGROUND OF THE INVENTION

1. Field of the Invention

The present invention relates to a belt drive apparatus and an image forming apparatus, and more particularly to a belt drive apparatus changing its belt conveyance speed according to the pressure contact/separating states to a body to receive the pressure contact and to an image forming apparatus equipped with the belt drive apparatus.

2. Description of the Related Art

A conventional image forming apparatus of an electrophotographic system, such as a printer and a copying machine, develops a toner image on a photoreceptor drum on the basis of image data and transfers the toner image onto paper. Then, the image forming apparatus fixes the toner image by thermocompression bonding in its fixing apparatus, and thereby forms an image on the paper.

As the fixing apparatus, a fixing apparatus adopting a belt system, which is equipped with a belt drive apparatus, including a plurality of supporting rollers and an endless belt (hereinafter simply referred to as a belt), laid across between the rollers in a tensioned condition, has been known. This fixing apparatus of the belt system brings the belt into pressure contact with, for example, a fixing roller, including a heating heater therein, to form a nipping section, and fixes a toner image, while nipping and conveying paper at this nipping section.

It is known that the belt of a belt drive apparatus used in such a fixing apparatus deviates to one end direction in the width direction thereof (the direction perpendicular to the traveling direction of the belt) and meanders as the belt travels. If the meander advances, the belt slips off from the supporting roller and is broken. Accordingly, it is generally performed to amend the meanders of a belt by detecting the position of the belt end while the belt is travelling, and by tilting one of the supporting rollers on the basis of the detection result to perform steering control (see, for example, Japanese Patent Application Laid-Open No. 2000-34031).

FIG. 7 is a view showing an example of a detection unit to detect the position of a belt end.

As shown in FIG. 7, a detection unit 110 is equipped with a transmission type photosensors PS1-PS3, each composed of a light emitting element and a light receiving element, which are arranged to be opposed to each other. A shielding body (a belt 101 itself in FIG. 7) moves between the light emitting elements and the light receiving elements, accompanying the position variations of a belt end 101*a*, and thereby transmits/intercepts lights from the light emitting elements. Each of the photosensors PS1-PS3 outputs a detected signal of a high level (hereinafter referred to as H level) or a low level (hereinafter referred to as L level) according to a light quantity received by the light receiving element thereof, and a control section judges the position of the belt end 101*a* on the basis of these detected signals. It is supposed, here, that the photosensors PS1-PS3 output an H level detected signal when the light from a light emitting element is intercepted and outputs an L level detected signal when the light from a light emitting element is transmitted.

For example, if an H level detected signal is output from the photosensor PS1 and L level detected signals are output from the photosensors PS2 and PS3 in the detection unit 110, the control section judges that the belt 101 is in a normal position where no meander amendments are needed.

If H level detected signals are output from the photosensors PS1 and PS2 and an L level detected signal is output from the photosensor PS3 (deviation to left in FIG. 7), or if L level detected signals are output from all of the photosensors PS1-PS3 (deviation to right in FIG. 7), then the control section judges that the belt 101 is at a position where a meander amendment is needed. In this case, the control section amends the meander of the belt 101 by steering control.

When H level detected signals are output from all of the photosensors PS1-PS3, the control section judges that the belt 101 is in an abnormal position where breakage of the belt 101 can be caused. In this case, the control section stops the drive of the belt 101 in order to prevent the advance of the meander and the breakage of the belt 101.

A belt drive apparatus equipped with such a detection unit 110 performs a so-called chattering removing processing in order to remove the influences of chattering caused by mechanical vibrations and the influences of roughening (irregularities) of the belt end 101*a*. In the chattering removing processing, by performing software control, the output signals from the photosensors PS1-PS3 are sampled twice (a so-called twice-reading) in accordance with a predetermined timer, and an abnormal/normal position of the belt 101 is judged when the values sampled twice agree with each other.

If there is not a sufficient time for removing the influences of chattering and the like, however, false detection can arise in the aforesaid chattering removing processing. If the false detection frequently arises, the reliability of the apparatus is deteriorated.

FIG. 8 is a diagram showing judgment results of belt positions on the basis of output signals from the photosensor PS3. FIG. 8 shows a case where false detection signals (*a*)-(*e*) are output owing to the influences of chattering and the like.

As shown in FIG. 8, if the false detection signal (a) is output from the photosensor PS3 when a real belt position is a normal position, it is falsely judged that the belt 101 has entered an abnormal position, because the signal levels sampled twice agree with each other, both of the values being H level. In this case, the restart of the belt drive is to be instructed just after the stopping of the belt drive is instructed, but a predetermined time is necessary for restarting the belt drive that has once been stopped.

Furthermore, if the false detection signal (d) is output from the photosensor PS3 when the real belt position is an abnormal position, it is falsely judged that the belt 101 has returned to a normal position, because the signal levels sampled twice agree with each other, both of the values being L level. In this case, the stopping of the belt drive is to be instructed just after the restart of the belt drive is instructed, and the processing load of the control section uselessly increases.

On the other hand, even if the false detection signals (b), (c), and (e) are output from the photosensor PS3, no false detection results because the signal levels sampled twice do not agree with each other.

It may be possible to simply lengthen the chattering removing processing time (for example, thrice-reading and the like) in order to effectively remove the false detection signals owing to the influences of chattering and the like. In that case, however, the timing of judging that the belt 101 has entered an abnormal position from a normal position becomes late, and consequently it becomes impossible to surely prevent the breakage of the belt 101. Furthermore, the timing of judging that the belt 101 has returned from an abnormal position to a normal position becomes late, and it becomes difficult to restart the drive of the belt 101 early.

Furthermore, if the belt 101 travels being in pressure contact with a body to receive the pressure contact, as in a belt drive apparatus to be used for a fixing apparatus, the meandering speed of the belt 101 in a pressure contact state in which the body to receive the pressure contact and the belt 101 are in pressure contact with each other, and the meandering speed of the belt 101 in a separating state in which the body and the belt 101 are separated from each other, are different from each other (the meandering speed in the separating state is faster than that in the pressure contact state), but the chattering removing processing is similarly performed in both the cases. Consequently, it cannot be said that the abnormality of a belt position is suitably judged according to the pressure contact/separating states. As a result, there is the possibility that the breakage of the belt 101 is caused or false detection is frequently caused.

Furthermore, because the technique described in Japanese Patent Application Laid-Open No. 2000-34031 detects the position variations of the belt end by an analog way, the detection mechanism for detecting a belt position and sensors to be used are complicated. Hence the technique has the problem of the difficulty of the cost reduction thereof.

SUMMARY OF THE INVENTION

According to one aspect of the present invention, there is provided a belt drive apparatus, including, an endless belt to be laid across in a tensioned condition between a plurality of supporting rollers and to travel with the endless belt being in pressure contact with or being separated from a body to receive the pressure contact, a pressure contact/separating state detection section to detect whether the endless belt is in the pressure contact with the body or separated therefrom, a belt position detection section to detect a position of the endless belt in a width direction thereof, a belt abnormality judging section to judge whether the endless belt is in an abnormal position or not based on a detection result obtained by the belt position detection section and one of judgment values which are set correspondingly to the pressure contact/separating state of the endless belt, and a belt drive control section to control a drive of the endless belt based on a judgment result obtained by the belt abnormality judging section.

Preferably, in the belt drive apparatus, the belt abnormality judging section increases an abnormality detection quantity to an upper limit according to an input time of an abnormal position detection signal output from the belt position detection section, the abnormal position detection signal indicating that the endless belt is in the abnormal position, and the belt abnormality judging section decreases the abnormality detection quantity to a lower limit according to an input time of a normal position detection signal output from the belt position detection section, the normal position detection signal indicating that the endless belt is in the normal position, and the belt abnormality judging section judges whether the endless belt is in the abnormal position or not by comparing the abnormality detection quantity with one of the judgment values.

Preferably, in the belt drive apparatus, the judgment values include a first abnormality judgment value and a second abnormality judgment value lower than the first abnormality judgment value, the belt abnormality judging section judges that the endless belt has entered the abnormal position from the normal position when the abnormality detection quantity exceeds the first abnormality judgment value in the pressure contact state, and the belt abnormality judging section judges that the endless belt has entered the abnormal position from the normal position when the abnormality detection quantity exceeds the second abnormality judgment value in the separating state.

Preferably, in the belt drive apparatus, the judgment values include a first normality judgment value and a second normality judgment value lower than the first normality judgment value, the belt abnormality judging section judges that the endless belt has returned from the abnormal position to the normal position when the abnormality detection quantity becomes lower than the first normality judgment value in the pressure contact state, and the belt abnormality judging section judges that the endless belt has returned from the abnormal position to the normal position when the abnormality detection quantity becomes lower than the second normality judgment value in the separating state.

Preferably, in the belt drive apparatus, an increase speed and a decrease speed of the abnormality detection quantity are set so that a time necessary for the abnormality detection quantity to reach the first abnormality judgment value from the lower limit by a monotonic increase is longer than a time necessary for the abnormality detection quantity to reach the first normality judgment value from the upper limit by a monotonic decrease, and a time necessary for the abnormality detection quantity to reach the second abnormality judgment value from the lower limit by the monotonic increase is longer than a time necessary for the abnormality detection quantity to reach the second normality judgment value from the upper limit by the monotonic decrease.

Preferably, the belt drive apparatus further includes a steering control section to amend meandering of the endless belt based on the detection result obtained by the belt position detection section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a block diagram showing a functional configuration of the image forming apparatus;

DESCRIPTION OF THE PREFERRED EMBODIMENTS

In the following, an embodiment of the present invention will be described in detail with reference to the accompanying drawings.

In the present embodiment, an example of applying an image forming apparatus according to the present invention to a digital multifunction printer (MFP), including the functions of a copier, a printer, and the like, will be described. To put it concretely, a belt drive apparatus according to the present invention is applied to a fixing apparatus of an image forming apparatus.

In addition, the image forming apparatus according to the present invention is not limited to the digital multifunction printer, but the image forming apparatus may be any apparatus, such as a facsimile apparatus or a single-function apparatus as a copier or a printer, as long as the apparatus is an image forming apparatus for performing image formation on paper.

Figure 1:
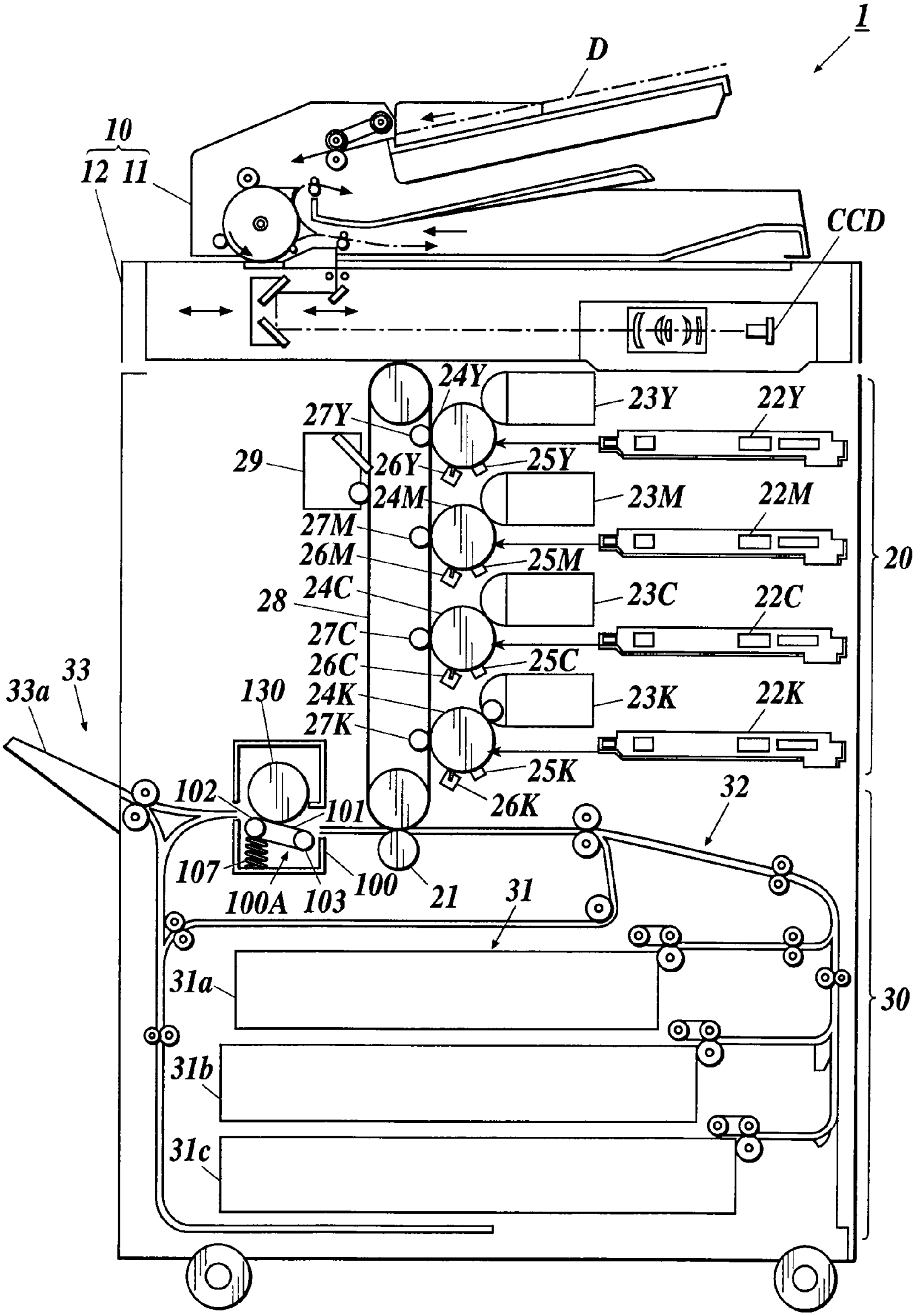
FIG. 1 is a view showing an internal configuration of an image forming apparatus according to an embodiment of the present invention.

FIG. 1 is a view showing an internal configuration of an image forming apparatus according to the present embodiment.

The image forming apparatus 1 according to the present embodiment forms an image on paper by superposing colors thereon on the basis of the image data obtained by reading a color image formed on an original or the image data input from an external information equipment (for example, a personal computer) through a network. The image forming apparatus 1 adopts a tandem system by being equipped with photoreceptor drums 24 (24Y, 24M, 24C, 24K) arranged in a row, corresponding to four colors of yellow (Y), magenta (M), cyan (C), black (K), respectively, and by transferring each color image sequentially in a set of procedure to form a color image on paper.

As shown in FIG. 1, the image forming apparatus 1 is composed of an image reading section 10, an image forming section 20, a conveyance section 30, and the like.

The image reading section 10 is composed of an automatic original paper feeding apparatus 11, which is called an auto document feeder (ADF), an original image scanning apparatus 12, and the like. The automatic original paper feeding apparatus 11 conveys an original D placed on an original tray with a conveyance mechanism to send out the original D to the original image scanning apparatus 12. The original image scanning apparatus 12 performs the light scanning of the conveyed original D and performs the photoelectric conversion of the original image on the original D to read the original image with a charge coupled device (CCD). The image includes text data and the like, such as a character and a sign, besides image data, such as a figure and a picture.

The image (the analog image signal) read by the image reading section 10 is output to a control section 90, described below, and is subjected to various kinds of image processing, such as analog-to-digital (A/D) conversion processing and shading correction processing. After that, the processed original image is subjected to color separation into each color of yellow (Y), magenta (M), cyan (C), and black (K) to be output to the image forming section 20 as image data to be output.

In addition, the automatic original paper feeding apparatus 11 is configured to be able to consecutively read the images of many originals D (including both side images) placed on the original tray at a stretch. The read data of the original images is stored in an internal image memory of the image forming section 20 and is to be sequentially read out as the image data to be output.

The image forming section 20 is composed of exposure devices 22 (22Y, 22M, 22C, 22K), development devices 23 (23Y, 23M, 23C, 23K), photoreceptor drums 24 (24Y, 24M, 24C, 24K), charging devices 25 (25Y, 25M, 25C, 25K), cleaning devices 26 (26Y, 26M, 26C, 26K), primary transfer rollers 27 (27Y, 27M, 27C, 27K), which are provided to each of the colors Y, M, C, and K, an intermediate transfer belt 28, a cleaning device 29, a secondary transfer roller 21, a fixing apparatus 100, and the like.

In the image forming section 20, the charging devices 25 charge the photoreceptor drums 24, respectively, and the exposure devices 22 radiate lights according to image data of the respective colors to the charged photoreceptor drums 24, respectively, to form electrostatic latent images, respectively. The development devices 23 make the respective color toners adhere onto the surfaces of the photoreceptor drums 24, on which electrostatic latent images are formed, respectively, to develop the electrostatic latent images. The primary transfer rollers 27 bring the intermediate transfer belt 28 into pressure contact with the photoreceptor drums 24, on which the toners adhere, respectively, and perform primary transfers of the respective color toner images onto the intermediate transfer belt 28 by sequentially superposing the toner images. The secondary transfer roller 21 brings paper into pressure contact with the intermediate transfer belt 28 with a pressure to perform the secondary transfer of the toner images to the paper, and thereby forms the toner images on the paper. The fixing apparatus 100 fixes the toner images formed on paper by thermo-compression bonding.

The cleaning devices 26 remove the toners remaining on the surfaces of the photoreceptor drums 24, respectively, after primary transfer. The cleaning device 29 removes the toners remaining on the intermediate transfer belt 28 after secondary transfer.

The conveyance section 30 is composed of a paper feeding device 31, a conveyance device 32, a paper ejecting device 33, and the like. The paper feeding device 31 includes three paper feeding trays 31*a*-31*c*, each of which houses a previously set kind of standardized paper or special paper that is identified on the basis of the weight, the size, and the like of paper. The paper housed in the paper feeding trays 31*a*-31*c* is sent out sheet by sheet from the uppermost part of the paper feeding trays 31*a*-31*c*, and is conveyed to the image forming section 20 by the conveyance device 32, equipped with a plurality of conveyance rollers. In the image forming section 20, the toner images on the intermediate transfer belt 28 are secondarily transferred collectively on one surface of paper by the secondary transfer roller 21, and fixing processing is performed to the transferred toner image by the fixing apparatus 100. Then, the paper on which the image is formed is ejected onto a catch tray 33*a* on the outside of the image forming apparatus 1 by the paper ejecting device 33 equipped with paper ejecting rollers.

The present embodiment adopts a fixing apparatus 100 of a belt system here. That is, the fixing apparatus 100 is equipped with a belt drive section 100A. This belt drive section 100A is configured in order that an endless belt 101, laid across between two supporting rollers 102 and 103 in a tensioned condition, travels with the endless belt 101 being in pressure contact with or being separated from a fixing roller 130, which is a body to receive the pressure contact. In the following, the endless belt 101 to be used in the fixing apparatus 100 will be called a fixing belt 101.

In the fixing apparatus 100, the fixing belt 101 is brought into pressure contact with the fixing roller 130 by a pressure contact/separating mechanism 104, which will be described later, and thereby a nipping section is formed. The fixing apparatus 100 is configured to fix a toner image while paper is nipped and conveyed by the nipping section. In addition, the fixing belt 101 and the fixing roller 130 are in the pressure contact state only when fixing processing is performed, and are in the separating state by being mutually separated when no fixing processing is performed.

Figure 2:
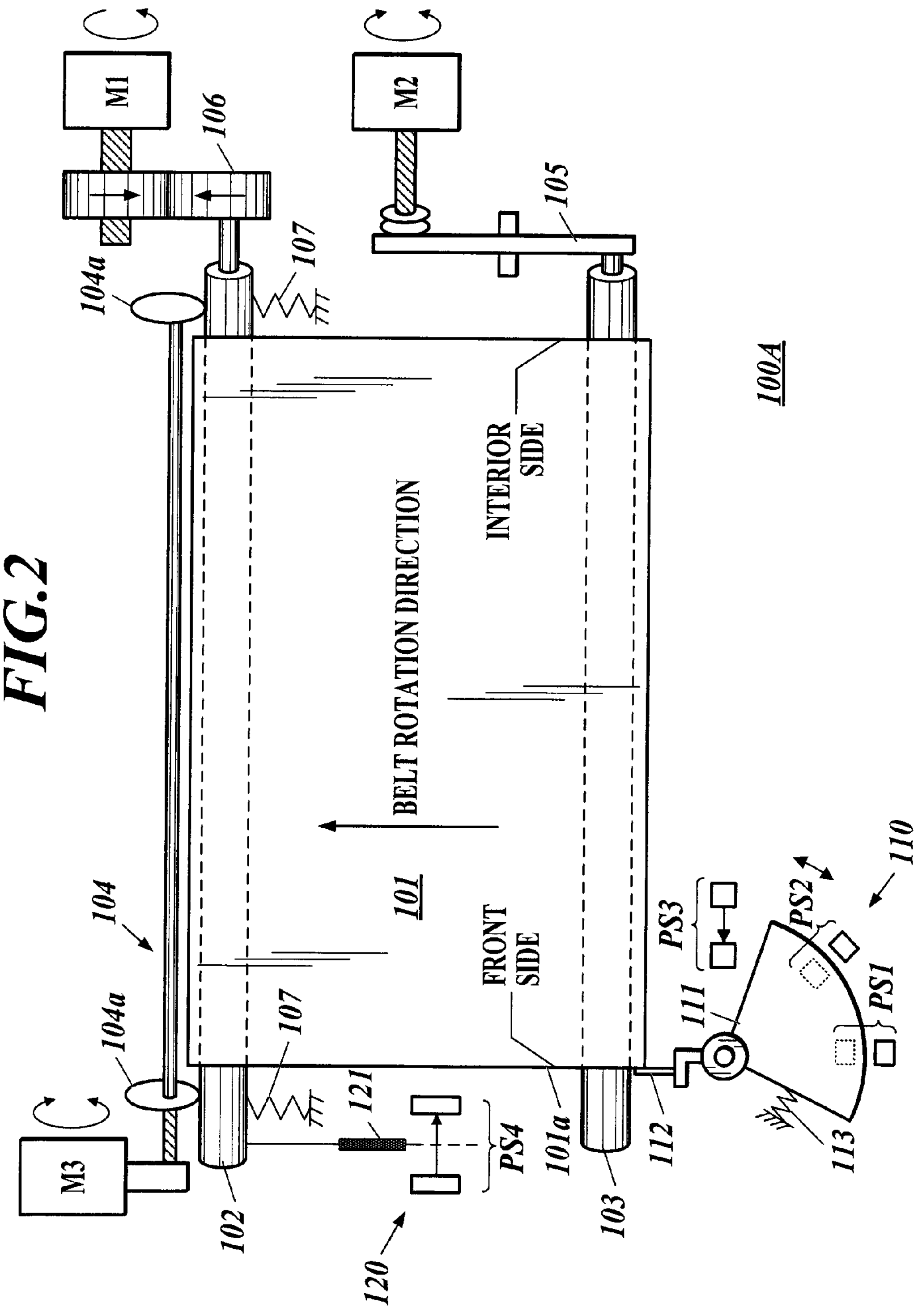
FIG. 2 is a view showing a belt drive section of a fixing apparatus.

FIG. 2 is a view showing the belt drive section 100A of the fixing apparatus 100. As shown in FIG. 2, the fixing belt 101 is laid across between the supporting rollers 102 and 103 in a tensioned condition in the belt drive section 100A.

The supporting roller 102 is connected to a belt drive motor M1 through a power transmitting mechanism 106. In the following, the supporting roller 102 will be called a drive roller 102. When the drive motor M1 is driven, the power is transmitted to the drive roller 102 and makes the laid-across fixing belt 101 travel. Furthermore, the drive roller 102 is biased into the direction to be separated from the fixing roller 130 with a biasing member 107, such as a spring, and is fixed by being supported by cams 104*a* of the pressure contact/separating mechanism 104. The fixing belt 101 is configured to be brought into pressure contact with or to be separated from the fixing roller 130 by the movement of the drive roller 102 following after the movement of pressure contact/separating mechanism 104.

The pressure contact/separating states of the fixing belt 101, that is, the pressure contact/separating states of the drive roller 102, are judged by a pressure contact/separating detection unit 120. The pressure contact/separating detection unit 120 is equipped with a transmission type photosensor (pressure contact/separating detecting sensor) PS4, composed of a light emitting element and a light receiving element, which are arranged to be mutually opposed, and a shielding body 121. The shielding body 121 is configured to move between the light emitting element and the light receiving element, according to the pressure contact/separating states of the drive roller 102 and to transmit/intercept the light from the light emitting element. For example, the shielding body 121 transmits the light from the light emitting element in the pressure contact state, and the shielding body 121 intercepts the light from the light emitting element in the separating state. The photosensor PS4 outputs a low (L) level detected signal, indicating the pressure contact state, or a high (H) level detected signal, indicating the separating state, on the basis of the light quantity received at the light receiving element.

The supporting roller 103 is connected to a steering motor M2 through a steering mechanism 105. In the following, the supporting roller 103 will be called a steering roller 103. When the fixing belt 101 is judged to be meandering on the basis of the position of the belt end 101*a*, the steering motor M2 is driven to raise or lower the interior side of the steering roller 103 to amend the meander of the fixing belt 101. The term "interior side" is one end direction of each of the drive roller 102, the supporting roller 103 and the fixing belt 101, in their width direction, as shown in FIG. 2. In addition, the opposite side of the "interior side" is hereinafter referred to as "front side." (See FIG. 2.)

The position of the belt end 101*a* is detected by a belt position detection unit 110. The belt position detection unit 110 is equipped with transmission type photosensors (belt position detecting sensors) PS1-PS3 each of which is composed of a light emitting element and a light receiving element arranged to be mutually opposed, and a fan-shaped shielding body 111. The shielding body 111 is connected to a biasing member 113 to be biased in order that a rod-like arm 112 may always contact with the belt end 101*a*. The shielding body 111 is configured in such a way that, when the shielding body 111 rotates around the shaft thereof, accompanying a position variation of the belt end 101*a*, then the peripheral wall of the shielding body 111 moves between the light emitting elements and the light receiving elements to transmit/intercept the lights from the light emitting elements.

The photosensors PS1-PS3 outputs detected signals PS1_SIG, PS2_SIG, and PS3_SIG, respectively, each being at H level or L level, on the basis of the light quantities received at the light receiving elements. The control section 90 judges the position of the belt end 101*a* on the basis of these detected signals. It is supposed here that each of the photosensors PS1-PS3 outputs an H level detected signal when the light from the light emitting element is intercepted, and outputs an L level detected signal when the light from the light emitting element is transmitted.

As described above, the belt drive apparatus (the belt drive section 100A of the fixing apparatus 100) according to the present embodiment is equipped with an endless belt (the fixing belt 101) to be laid across in a tensioned condition between a plurality of supporting rollers (the drive roller 102 and the steering roller 103) and to travel with the endless belt being in pressure contact with or being separated from a body to receive the pressure contact (the fixing roller 130); a pressure contact/separating state detection section (the pressure contact/separating detection unit 120) to detect whether the endless belt is in the pressure contact with the body or separated therefrom; and a belt position detection section (the belt position detection unit 110) to detect a position of the endless belt in the width direction thereof.

The present embodiment is configured to perform appropriate chattering removing processing to the detected signal PS3_SIG output from the photosensor PS3 of the belt position detection unit 110 in the belt drive section 100A, and thereby to make it possible to judge the belt position accurately and quickly according to the pressure contact/separating states of the fixing belt 101.

FIG. 3 is a block diagram showing a functional configuration of the image forming apparatus 1.

In FIG. 3, the control section 90 is composed of a central processing unit (CPU) 91, a random access memory (RAM) 92, a read only memory ROM 93, and the like. The CPU 91 reads out a program according to the kind of processing from the ROM 93 to develop the read-out program into the RAM 92, and performs the integrated control of the operation of each block of the image forming apparatus 1 in accordance with the developed program.

An image memory 71 is a storage region for storing image data for forming an image on paper, and is composed of, for example, a storage device, such as a volatile memory. The image memory 71 stores the image data read by the image reading section 10, and the image data input from an external information equipment through a network.

An operation displaying section 72 is equipped with a liquid crystal display (LCD) and/or a touch panel etc., and performs the display of various kinds of information pertaining to the image forming apparatus 1 and/or the reception of various input operations by an operator.

The image forming apparatus 1 is provided with a paper detecting sensor 73, a toner density sensor 74, and the other various sensors not shown, and each sensor outputs a detected signal to the control section 90. The control section 90 performs various kinds of processing on the basis of the input detected signals.

An image processing control section 81, a drum drive control section 82, a process control section 83, and an intermediate transfer belt drive control section 84 control each block (except the fixing apparatus 100) of the image forming section 20 on the basis of the control signals from the control section 90.

A conveyance control section 85 controls the conveyance and the reversal of paper in the conveyance section 30 on the basis of the control signals from the control section 90.

A belt drive control section 151, a steering control section 152, and a pressure contact/separating mechanism control section 153 control each block of the belt drive section 100A on the basis of the control signals from the control section 90. The belt drive control section 151 controls on/off of the belt drive motor M1 in accordance with the belt position (normal/abnormal), judged on the basis of the detected signal PS3_SIG from the belt position detecting sensor PS3. The steering control section 152 performs the steering control by tilting the steering roller 103 in accordance with a meander direction (front side, interior side) judged on the basis of detected signals PS1_SIG and PS2_SIG from the belt position detecting sensors PS1 and PS2, respectively. The pressure contact/separating mechanism control section 153 controls the pressure contact/separating mechanism 104 in accordance with the start/end of fixing processing, and makes the fixing belt 101 (drive roller 102) in pressure contact with or separating from the fixing roller 130.

A fixing temperature control section 154 controls the temperature of a fixing heater 155 provided in the fixing roller 130, on the basis of a control signal from the control section 90 and a detected signal from a temperature detecting sensor 156 provided in the neighborhood of the fixing roller 130.

Figure 4:
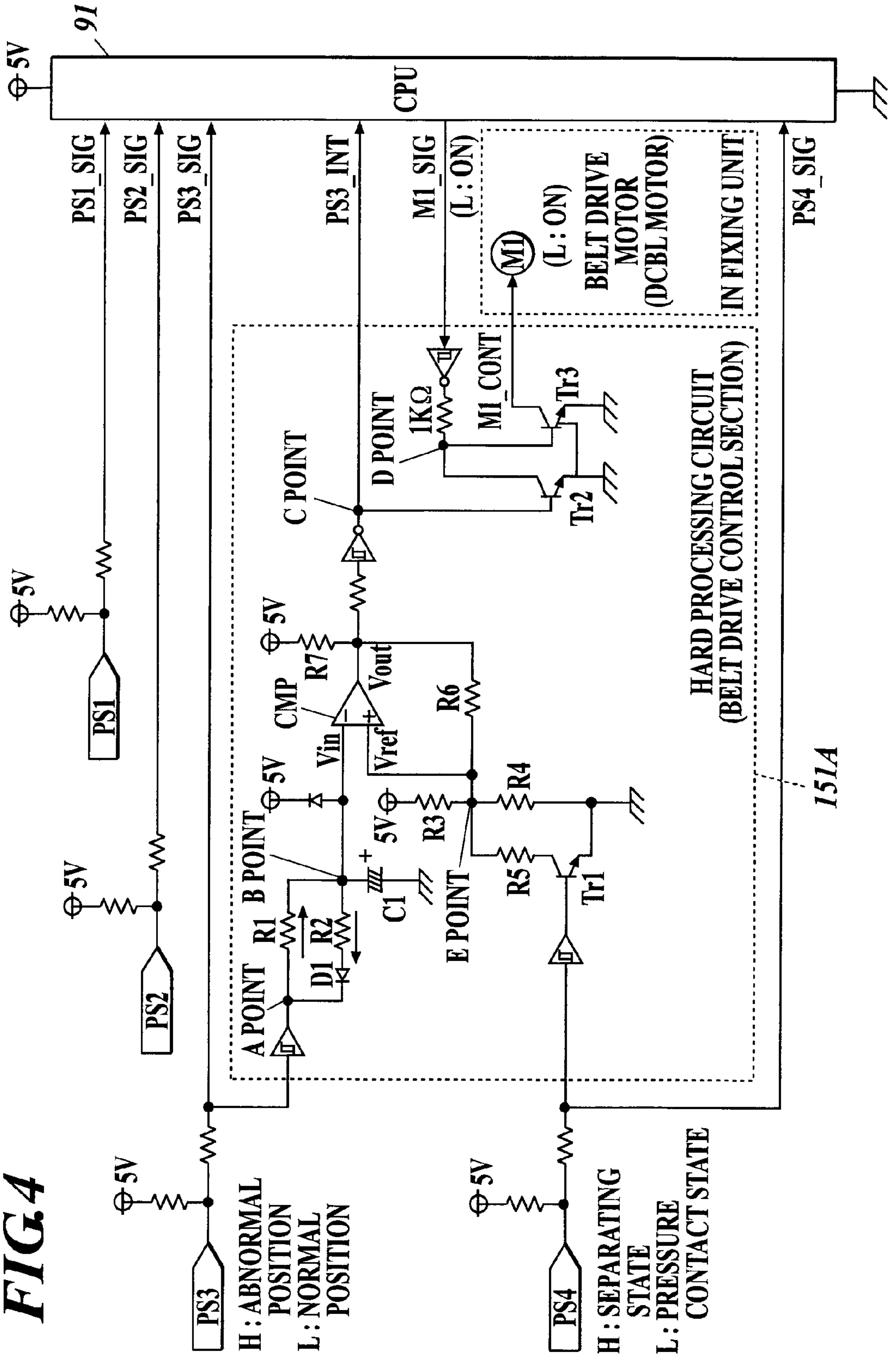
FIG. 4 is a diagram showing an example of a hard processing circuit to realize a chattering removing processing and a belt drive control processing in the belt drive section.

FIG. 4 is a diagram showing an example of a hard processing circuit to realize the chattering removing processing and a belt drive control processing in the belt drive section 100A.

As shown in FIG. 4, the detected signal PS3_SIG output from the photosensor PS3 and a detected signal PS4_SIG output from the photosensor PS4, are input into the CPU 91 and a hard processing circuit 151A. Furthermore, the detected signals PS1_SIG and PS2_SIG output from the photosensors PS1 and PS2, respectively, are input into the CPU 91.

In the hard processing circuit 151A, an input voltage (=a voltage at B point) Vin based on the detected signal PS3_SIG is given to an −input terminal of a comparator CMP, and a threshold voltage (=a voltage at E point) Vref based on the detected signal PS4_SIG is given to an +input terminal of the comparator CMP. The comparator CMP compares the input voltage Vin and the threshold voltage Vref.

When the input voltage Vin exceeds the threshold voltage Vref, an output voltage Vout (=a voltage at C point) reverses from the L level to the H level. When the input voltage Vin becomes lower than the threshold voltage Vref, the output voltage Vout reverses from the H level to the L level.

The output voltage Vout is input into the CPU 91 as a detected signal PS3_INT after the chattering removing processing. Here, if the fixing belt 101 is judged to be in an abnormal position, the detected signal PS3_INT becomes the H level. In addition, if the fixing belt 101 is judged to be in a normal position, the detected signal PS3_INT becomes the L level.

Figure 5:
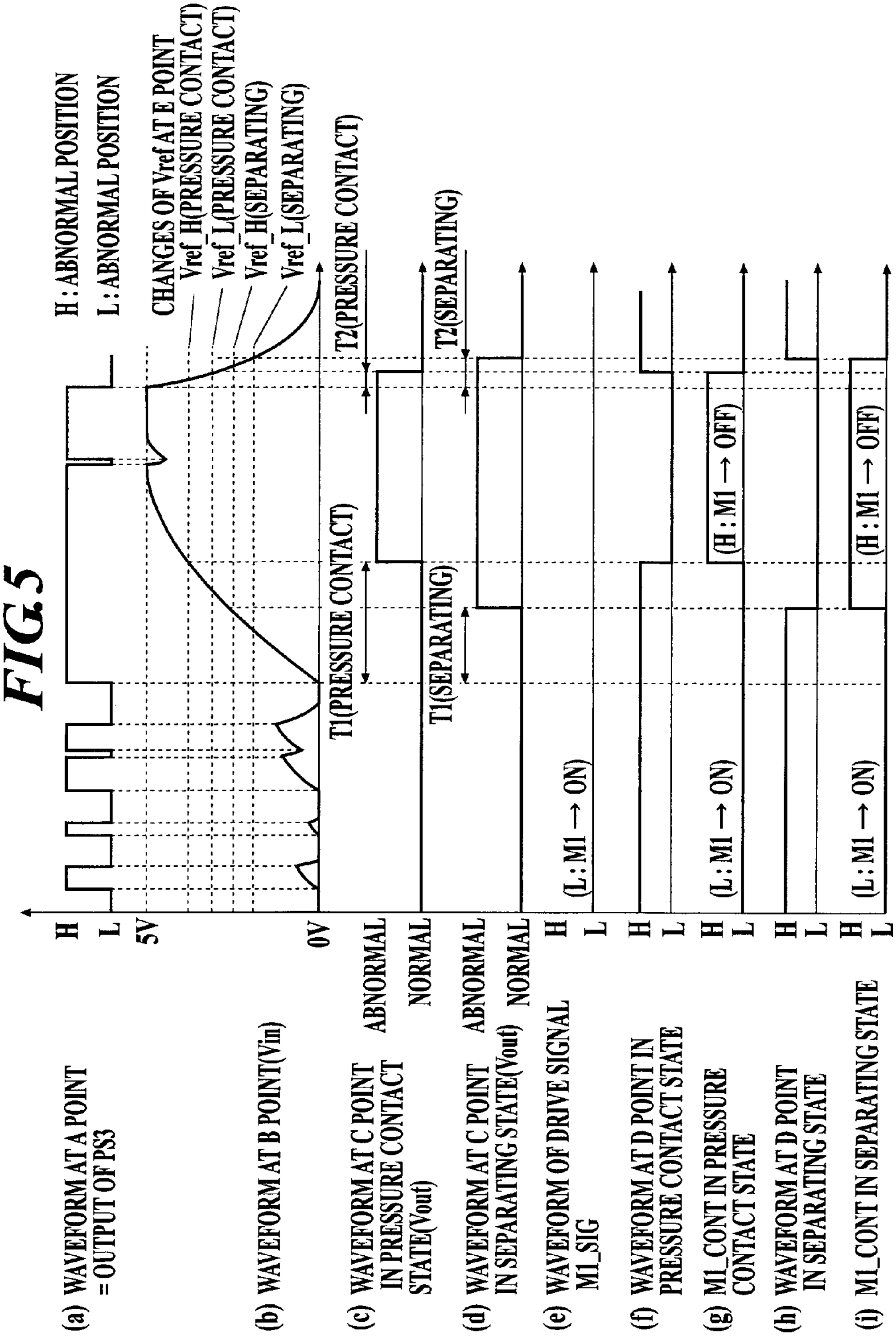
FIG. 5 is a diagram showing voltage waveforms at A-D points in FIG. 4 and output voltage waveforms to be output to a belt drive motor.

On the other hand, the CPU 91 outputs an L level drive signal M1_SIG for driving the belt drive motor M1 to the hard processing circuit 151A (FIG. 5(*e*)). A control signal M1_CONT for controlling the belt drive motor M1 is output to the belt drive motor M1 on the basis of the drive signal M1_SIG and the detected signal PS3_INT.

When the detected signal PS3_INT is the H level (that is, when the fixing belt 101 is judged to be in an abnormal position), then the H level control signal M1_CONT is output to the belt drive motor M1 to stop the belt drive motor M1. When the detected signal PS3_INT is the L level (that is, when the fixing belt 101 is judged to be in a normal position), then the L level control signal M1_CONT is output, and the belt drive motor M1 is driven.

As described above, by the hard processing circuit 151A shown in FIG. 4, the chattering removing processing and the belt drive control processing are realized.

The operation of the hard processing circuit 151A shown in FIG. 4 will concretely be described with reference to FIG. 5. FIG. 5 shows the case where the detected signal PS3_SIG of the voltage waveform shown in FIG. 5(*a*) is input into the hard processing circuit 151A. That is, the waveform shown in FIG. 5(*a*) is the voltage waveform at A point.

As shown in FIG. 4, the detected signal PS3_SIG input into the hard processing circuit 151A passes through an integration circuit composed of resistors R1 and R2, a capacitor C1, and the like, to be given to the −input terminal of the comparator CMP. Consequently, the voltage at the B point, which is the input voltage Vin of the comparator CMP, changes in proportion to the time integral of a current input into the capacitor C1. That is, when the detected signal PS3_SIG as shown in FIG. 5(*a*) is input, the voltage waveform at the B point becomes the one shown in FIG. 5(*b*).

When the H level detected signal PS3_SIG, indicating that the fixing belt 101 is in an abnormal position, is input, a current flows through the resistor R1, and the capacitor C1 is charged. On the other hand, when the L level detected signal PS3_SIG, indicating that the fixing belt 101 is in a normal position, is input, a current flows from the capacitor C1 through the resistors R1 and R2, and the capacitor C1 is discharged.

By configuring the hard processing circuit 151A in such a way, the discharge time of the capacitor C1 is made to be shorter than the charge time. The entering of the fixing belt 101 from a normal position to an abnormal position can hereby be detected over a sufficient time in order to surely remove the influences of chattering and the like, and the returning of the fixing belt 101 from an abnormal position to the normal position can early be detected. In addition, if the resistance value of the resistor R2 is set to be smaller than that of the resistor R1, the discharge time can further be shortened.

The voltage (the voltage at the E point) in accordance with the pressure contact/separating states of the fixing belt 101 is given to the +input terminal of the comparator CMP as the threshold voltage Vref. To put it concretely, when the L level detected signal PS4_SIG, indicating that the fixing belt 101 is in pressure contact with the fixing roller 130, is input into the hard processing circuit 151A, no currents flow through a resistor R5 by the transistor Tr1. When the H level detected signal PS4_SIG, indicating that the fixing belt 101 is separated from the fixing roller 130, is input into the hard processing circuit 151A, a current flows through the resistor R5. Consequently, the voltage at the E point in the pressure contact state (PS4_SIG is the L level) is higher than that in the separating state (PS4_SIG is the H level).

That is, when the threshold voltage in the pressure contact state is denoted by Vref (pressure contact), and when the threshold voltage in the separating state is denoted by Vref (separating), the threshold voltage Vref (pressure contact) or Vref (separating), which satisfies the formula of Vref (pressure contact)>Vref (separating), is given to the +input terminal of the comparator CMP, according to the pressure contact/separating states.

Furthermore, because positive feedback is provided to the comparator CMP (a so-called hysteresis comparator), a threshold voltage (hereinafter referred to as a low threshold voltage) Vref_L when an output voltage is reversed from the H level to the L level is lower than a threshold voltage (hereinafter referred to as a high threshold voltage) Vref_H when an output voltage is reversed from the L level to the H level.

That is, the comparator CMP compares the input voltage Vin into the −input terminal with any one of four judgment values of the high threshold value Vref_H (pressure contact) in a pressure contact state, the low threshold value Vref_L (pressure contact) in a pressure contact state, the high threshold value Vref_H (separating) in a separating state, and the low threshold value Vref_L (separating) in a separating state.

That is, as shown in FIG. 5, in the case of a pressure contact state, the output voltage Vout (FIG. 5(*c*)) is reversed from the L level to the H level when the input voltage Vin (FIG. 5(*b*)) of the comparator CMP exceeds the high threshold voltage Vref_H (pressure contact). When the output voltage Vout becomes the H level, the voltage at a D point becomes the L level (FIG. 5(*f*)). Consequently, the control signal M1_CONT becomes the H level (FIG. 5(*g*)), and the belt drive motor M1 is stopped.

Furthermore, when the input voltage Vin (FIG. 5(*b*)) into the comparator CMP becomes lower than the low threshold voltage Vref_L (pressure contact), the output voltage Vout (FIG. 5(*c*)) is reversed from the H level to the L level. When the output voltage Vout becomes the L level, the voltage at the D point becomes the H level (FIG. 5(*f*)). Consequently, the control signal M1_CONT becomes the L level (FIG. 5(*g*)), and the belt drive motor M1 is driven.

Furthermore, in the case of the separating state, the output voltage Vout (FIG. 5(*d*)) is reversed from the L level to the H level when the input voltage Vin (FIG. 5(*b*)) into the comparator CMP exceeds the high threshold voltage Vref_H (separating). When the output voltage Vout becomes the H level, the voltage at the D point becomes the L level (FIG. 5(*h*)). Consequently, the control signal M1_CONT becomes the H level (FIG. 5(*i*)), and the belt drive motor M1 is stopped.

Furthermore, when the input voltage Vin (FIG. 5(*b*)) into the comparator CMP becomes lower than the low threshold voltage Vref_L (separating), the output voltage Vout (FIG. 5(*d*)) is reversed from the H level to the L level. When the output voltage Vout becomes the L level, the voltage at the D point becomes the H level (FIG. 5(*h*)). Consequently, the control signal M1_CONT becomes the L level (FIG. 5(*i*)), and the belt drive motor M1 is driven.

Because the high threshold voltage Vref_H (separating) in the separating state is lower than the high threshold voltage Vref_H (pressure contact) in the pressure contact state, the abnormality in the separating state is to be detected earlier than the abnormality in the pressure contact state if the influences of chattering and the like are the same. That is, in the separating state, the hard processing circuit 151A is configured in order to be able to judge whether the belt 101 has entered an abnormal position from a normal position or not in a time shorter than the time required in the pressure contact state, because the meandering speed is fast in the separating state.

Furthermore, because the circuits of the hard processing circuit 151A are configured in order that the discharge time of the capacitor C1 may become shorter than the charge time thereof, a time (T1 (pressure contact)) necessary for the input voltage Vin to reach the high threshold voltage Vref_H (pressure contact) from the lower limit of the input voltage Vin by a monotonic increase is longer than a time (T2 (pressure contact)) necessary for the input voltage Vin to reach the low threshold voltage Vref_L (pressure contact) from the upper limit of the input voltage Vin by a monotonic decrease. Furthermore, a time (T1 (separating)) necessary for the input voltage Vin to reach the high threshold voltage Vref_H (separating) from the lower limit of the input voltage Vin by the monotonic increase is longer than a time (T2 (separating)) necessary for the input voltage Vin to reach the low threshold voltage Vref_L (separating) from the upper limit of the input voltage Vin by the monotonic decrease.

That is, when it is judged whether the fixing belt 101 has entered an abnormal position from the normal position or not, the judgment is carefully performed lest false detection should be caused by the influences of chattering and the like and the fixing apparatus 100 should excessively be stopped. When it is judged whether the fixing belt 101 has returned from an abnormal position to the normal position or not, the judgment is quickly performed because the disadvantages caused by the false detection are slight.

[Modification]

Although the example shown in FIG. 4 realizes the chattering removing processing and the belt drive control processing by means of the hard processing circuit 151A, a modification realizes the chattering removing processing by the hard processing circuit 151A and realizes the belt drive control processing by software control.

Figure 6:
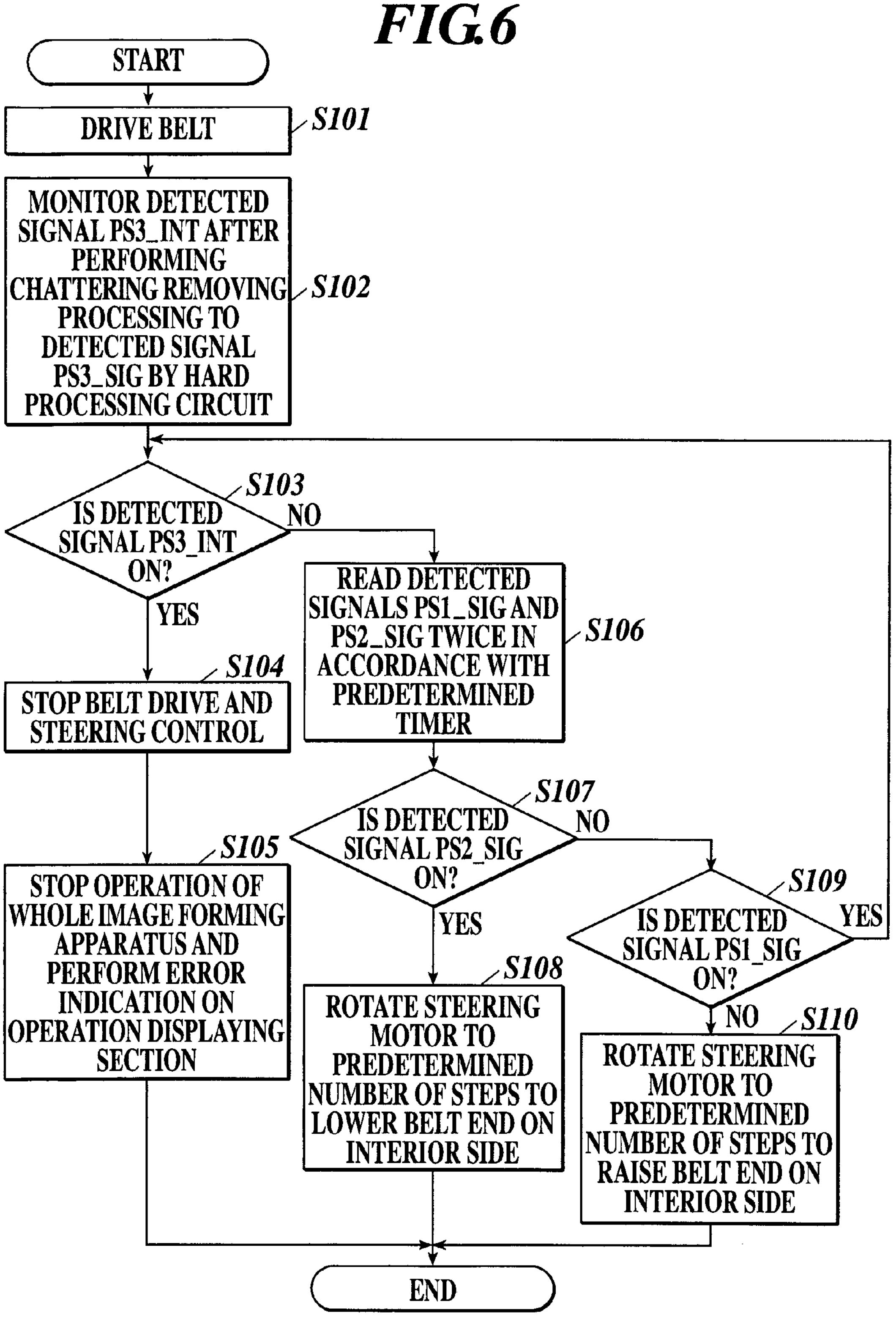
FIG. 6 is a flow chart showing an example of a belt drive control processing and a steering processing of a modification.
Figure 7:
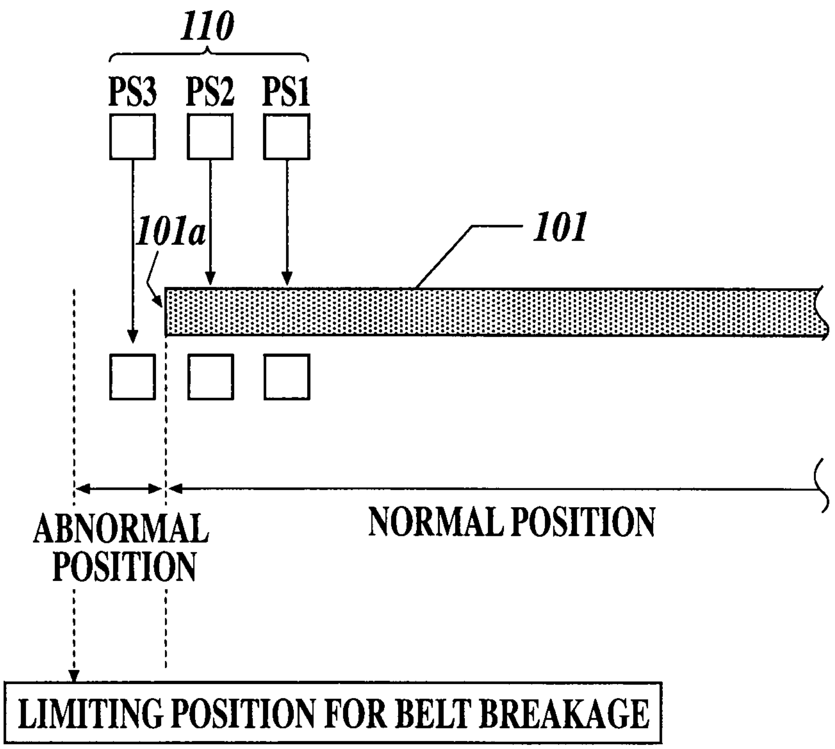
FIG. 7 is a view showing an example of a detection unit to detect positions of a belt end.
Figure 8:
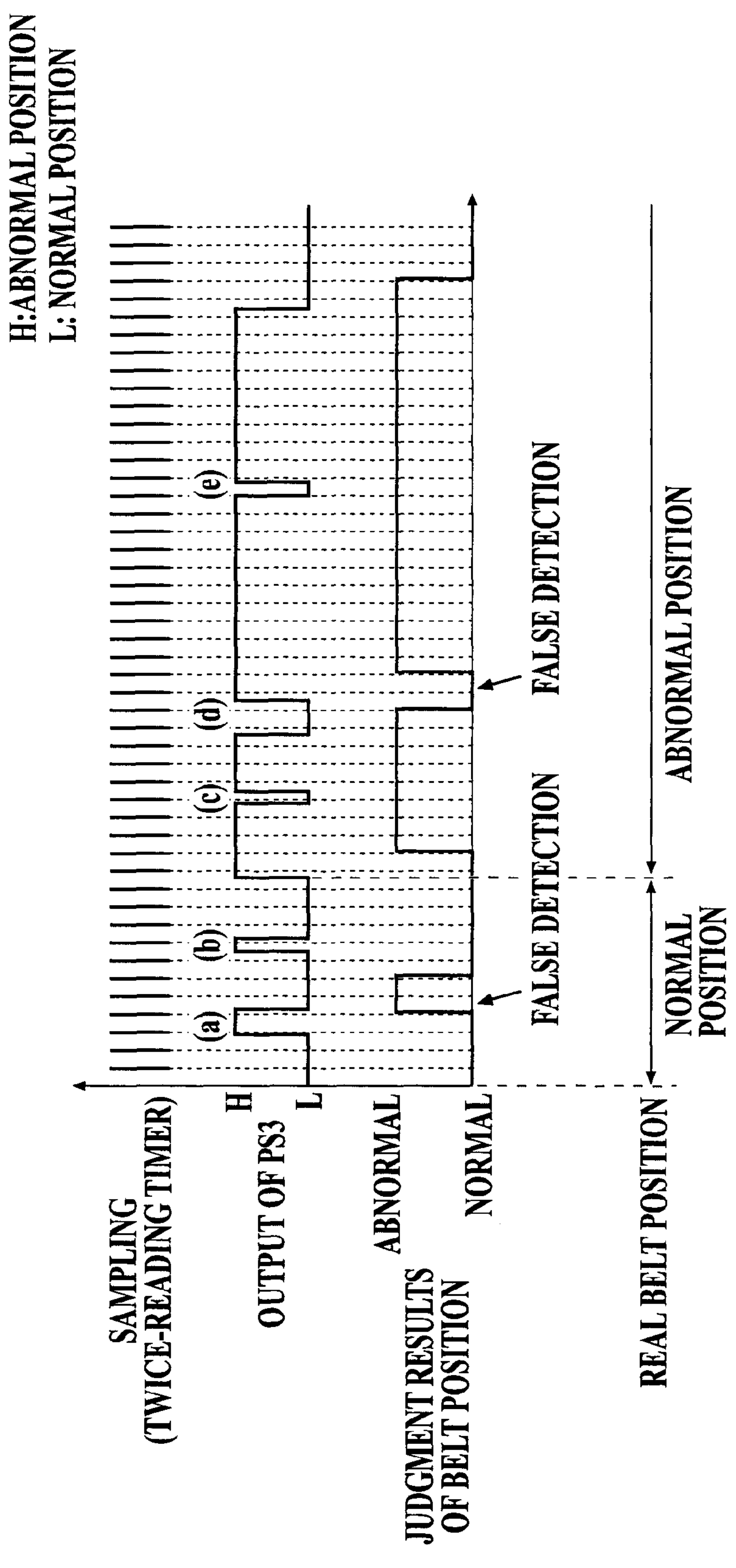
FIG. 8 is a diagram showing judgment results of belt positions on the basis of output signals from a photosensor PS3.

FIG. 6 is a flow chart showing an example of a belt drive control processing and a steering processing according to the modification. The belt drive control processing and the steering processing shown in FIG. 6 are realized by the execution of predetermined processing programs by the CPU 91 on the basis of the detected signals PS1_SIG, PS2_SIG, and PS3_INT shown in FIG. 4.

At Step S101 in FIG. 6, the CPU 91 drives the belt drive motor M1 to make the fixing belt 101 travel.

At Step S102, the CPU 91 monitors the detected signal PS3_INT after the hard processing circuit 151A has performed a chattering removing processing to the detected signal PS3_SIG.

At Step S103, the CPU 91 judges whether the detected signal PS3_INT is on (H level) or not. If the CPU 91 judges that the detected signal PS3_INT is on, the CPU 91 moves the processing to that at Step S104. If the CPU 91 judges that the detected signal PS3_INT is off, the CPU 91 moves the processing to that at Step S106.

At Step S104, the CPU 91 stops the belt drive motor M1 and the steering motor M2 in order to prevent the breakage of the fixing belt 101.

At Step S105, the CPU 91 stops the operation of the whole of the image forming apparatus 1, and makes the operation displaying section 72 display an error indication.

At Step S106, the CPU 91 twice reads the detected signals PS1_SIG and PS2_SIG input from the photosensors PS1 and PS2, respectively, in accordance with the times of a predetermined timer. The twice-reading is for removing the influences of chattering and the like.

At Step S107, the CPU 91 judges whether the detected signal PS2_SIG is on (H level) or not as the results of the twice-reading. If the CPU 91 judges that the detected signal PS2_SIG is on (in the case where the fixing belt 101 is meandering, deviating to the front side in FIG. 2), the CPU 91 moves the processing to that at Step S108. If the CPU 91 judges that the detected signal PS2_SIG is off, the CPU 91 moves the processing to that at Step S109.

At Step S108, the CPU 91 rotates the steering motor M2 to the predetermined number of steps and lowers the belt end on the interior side to amend the meandering of the fixing belt 101.

At Step S109, the CPU 91 judges whether the detected signal PS1_SIG is on (H level) or not as the results of the twice-reading. If the CPU 91 judges that the detected signal PS1_SIG is on, the CPU 91 moves the processing to that at Step S103. If the CPU 91 judges that the detected signal PS1_SIG is off (in the case where the fixing belt 101 is meandering, deviating to the interior side in FIG. 2), the CPU 91 moves the processing to that at Step S110.

At Step S110, the CPU 91 rotates the steering motor M2 to the predetermined number of steps and raises the belt end of the interior side to amend the meandering of the fixing belt 101.

In this way, the belt drive control processing is realized by the processing at Steps S102-S104, and the steering control processing is realized by the processing at Steps S106-S110.

As described above, according to a first aspect of the preferable embodiment of the present invention, the belt drive apparatus (the belt drive section 100A of the fixing apparatus 100) is equipped with a belt abnormality judging section (the hard processing circuit 151A) to judge whether a belt is in an abnormal position or not on the basis of a detection result (the input voltage Vin) obtained by a belt position detection section (the belt position detection unit 110) and a judgment value (the threshold voltage Vref), and a belt drive control section (the hard processing circuit 151A or processing at Steps S102-104 in FIG. 6) to control the drive (travel/stop) of the endless belt on the basis of the judgment result (the detected signal PS3_INT) obtained by the belt abnormality judging section.

The judgment value for judging whether the endless belt is in an abnormal position or not is set correspondingly to the pressure contact/separating states of the endless belt (threshold voltage Vref (pressure contact), Vref (separating)).

The appropriate chattering removing processing is hereby executed correspondingly to the pressure contact/separating states, and the belt position is detected accurately and quickly. Consequently, the belt breakage caused by meandering can surely be prevented. Furthermore, the stopped drive of the fixing belt 101 can early be restarted.

To put it concretely, the belt abnormality judging section (the hard processing circuit 151A) increases an abnormality detection quantity (the input voltage Vin) to the upper limit according to an input time of the abnormal position detection signal (the H level detected signal PS3_SIG), indicating that the endless belt is in an abnormal position, which abnormal position detection signal has been output from the belt position detection section (the belt position detection unit 110). On the other hand, the belt abnormality judging section decreases the abnormality detection quantity (the input voltage Vin) to the lower limit according to an input time of a normal position detection signal (the L level detected signal PS3_SIG), indicating that the endless belt is in a normal position, which normal position detection signal has been output from the belt position detection section.

Then, it is judged whether the endless belt is in an abnormal position or not by comparing the abnormality detection quantity and one of the judgment values (threshold voltage Vref (pressure contact), and Vref (separating)).

The influences of chattering and the like can hereby be removed effectively, and the belt position can accurately be detected.

Furthermore, the belt drive apparatus (the belt drive section 100A) has a first abnormality judgment value (the high threshold voltage Vref_H (pressure contact)) and a second abnormality judgment value (the high threshold voltage Vref_H (separating)), which is lower than the first abnormality judgment value, as judgment values.

In the pressure contact state, the belt abnormality judging section (the hard processing circuit 151A) judges that the endless belt has entered an abnormal position from a normal position when the abnormality detection quantity (the input voltage Vin) exceeds the first abnormality judgment value. In the separating state, the belt abnormality judging section judges that the endless belt has entered an abnormal position from a normal position when the abnormality detection quantity exceeds the second abnormality judgment value.

The entering of the belt into the abnormal position in the separating state is hereby to be detected earlier than that in the pressure contact state if the influences of chattering and the like are the same. That is, the meandering speed of the belt in the separating state is faster than that in the pressure contact state, but the belt breakage caused by meandering can surely be prevented also in the separating state by shortening the time for judging that the belt has entered from a normal position to an abnormal position.

Furthermore, the belt drive apparatus (the belt drive section 100A) has a first normality judgment value (the low threshold voltage Vref_L (pressure contact)) and a second normality judgment value (the low threshold voltage Vref_L (separating)), which is lower than the first normality judgment value, as judgment values.

In the pressure contact state, the belt abnormality judging section (the hard processing circuit 151A) judges that the belt has returned from an abnormal position to a normal position when the abnormality detection quantity (the input voltage Vin) becomes lower than the first normality judgment value. In the separating state, the belt abnormality judging section judges that the belt has returned from an abnormal position to a normal position when the abnormality detection quantity becomes lower than the second normality judgment value.

The returning of the belt into the normal position in the separating state is hereby to be detected later than that in the pressure contact state if the influences of chattering and the like are the same. That is, the meandering speed of the belt in the separating state is faster than that in the pressure contact state, but the occurrence of the situation in which the belt returns to the abnormal position just after a restart of the belt drive can be prevented by restarting the drive of the belt after the belt has sufficiently returned to the normal position.

Furthermore, the increase speed (the charging speed of the capacitor C1) and the decrease speed (the discharging speed of the capacitor C1) of the abnormality detection quantity (the input voltage Vin) are set in order that a time (T1 (pressure contact)) necessary for the abnormality detection quantity to reach the first abnormality judgment value from the lower limit of the abnormality detection quantity by a way of monotonic increase may be longer than a time (T2 (pressure contact)) necessary for the abnormality detection quantity to reach the first normality judgment value from the upper limit of the abnormality detection quantity by a way of monotonic decrease, and that a time (T1 (separating)) necessary for the abnormality detection quantity to reach the second abnormality judgment value from the lower limit of the abnormality judgment value by a way of monotonic increase may be longer than a time (T2 (separating)) necessary for the abnormality judgment value to reach the second normality judgment value from the upper limit of the abnormality judgment value by a way of monotonic decrease.

It can hereby be judged carefully whether the fixing belt 101 has entered an abnormal position from a normal position lest false detection should be caused by the influences of chattering and the like and the belt drive apparatus should excessively be stopped. On the other hand, it can be quickly judged whether the fixing belt 101 has returned from the abnormal position to a normal position or not.

In the above, the present invention devised by the inventor has concretely been described on the basis of an embodiment, but the present invention is not limited to the embodiment and can be changed without departing from the subject matter thereof.

For example, although the case where the chattering removing processing in the belt drive apparatus (the belt drive section 100A) is realized by hardware control (the hard processing circuit 151A) has been described in the aforesaid embodiment, the chattering removing processing can also be realized by software control by the CPU 91. For example, input times of an abnormal position detection signal (the H level detected signal PS3_SIG), indicating that the endless belt is in an abnormal position, which abnormal position detection signal has been output from the belt position detection section (the belt position detection unit 110), may be integrated with a timer to be set as an abnormality detection quantity. And the abnormality detection quantity may be compared with a judgment value, set according to pressure contact/separating states.

Furthermore, the belt drive apparatus according to the present invention can be applied to a belt drive apparatus where an endless belt travels being in pressure contact with or being separated from a body to receive the pressure contact, such as a drive apparatus of the intermediate transfer belt 28, in addition to the fixing apparatus of an image forming apparatus.

The presently disclosed embodiment should be considered to be an illustration and not to be restrictive in all points. The scope of the present invention is indicated not by the above description but by claims, and the scope of the present invention is intended to include all the changes within the range of the equivalent matters to claims.

The entire disclosure of Japanese Patent Application No. 2009-277741 filed on Dec. 7, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A belt drive apparatus, comprising:

an endless belt to be laid across in a tensioned condition between a plurality of supporting rollers and to travel with the endless belt being in pressure contact with or being separated from a body to receive the pressure contact;

a pressure contact/separating state detection section to detect whether the endless belt is in the pressure contact with the body or separated therefrom;

a belt position detection section to detect a position of the endless belt in a width direction thereof;

a belt abnormality judging section to judge whether the endless belt is in an abnormal position or not based on a detection result obtained by the belt position detection section and one of judgment values which are set correspondingly to the pressure contact/separating state of the endless belt; and a belt drive control section to control a drive of the endless belt based on a judgment result obtained by the belt abnormality judging section.

2. The belt drive apparatus according to claim 1, wherein the belt abnormality judging section increases an abnormality detection quantity to an upper limit according to an input time of an abnormal position detection signal output from the belt position detection section, the abnormal position detection signal indicating that the endless belt is in the abnormal position, and the belt abnormality judging section decreases the abnormality detection quantity to a lower limit according to an input time of a normal position detection signal output from the belt position detection section, the normal position detection signal indicating that the endless belt is in the normal position, and the belt abnormality judging section judges whether the endless belt is in the abnormal position or not by comparing the abnormality detection quantity with one of the judgment values.

3. The belt drive apparatus according to claim 2, wherein the judgment values include a first abnormality judgment value and a second abnormality judgment value lower than the first abnormality judgment value;

the belt abnormality judging section judges that the endless belt has entered the abnormal position from the normal position when the abnormality detection quantity exceeds the first abnormality judgment value in the pressure contact state; and the belt abnormality judging section judges that the endless belt has entered the abnormal position from the normal position when the abnormality detection quantity exceeds the second abnormality judgment value in the separating state.

4. The belt drive apparatus according to claim 3, wherein the judgment values include a first normality judgment value and a second normality judgment value lower than the first normality judgment value;

the belt abnormality judging section judges that the endless belt has returned from the abnormal position to the normal position when the abnormality detection quantity becomes lower than the first normality judgment value in the pressure contact state; and the belt abnormality judging section judges that the endless belt has returned from the abnormal position to the normal position when the abnormality detection quantity becomes lower than the second normality judgment value in the separating state.

5. The belt drive apparatus according to claim 4, wherein an increase speed and a decrease speed of the abnormality detection quantity are set so that a time necessary for the abnormality detection quantity to reach the first abnormality judgment value from the lower limit by a monotonic increase is longer than a time necessary for the abnormality detection quantity to reach the first normality judgment value from the upper limit by a monotonic decrease; and a time necessary for the abnormality detection quantity to reach the second abnormality judgment value from the lower limit by the monotonic increase is longer than a time necessary for the abnormality detection quantity to reach the second normality judgment value from the upper limit by the monotonic decrease.

6. The belt drive apparatus according to claim 1, further comprising a steering control section to amend meandering of the endless belt based on the detection result obtained by the belt position detection section.

7. An image forming apparatus comprising a fixing apparatus to fix a toner image formed on paper, the fixing apparatus including:

an endless belt to be laid across in a tensioned condition between a plurality of supporting rollers and to travel with the endless belt being in pressure contact with or being separated from a body to receive the pressure contact;

a pressure contact/separating state detection section to detect whether the endless belt is in the pressure contact with the body or separated therefrom;

a belt position detection section to detect a position of the endless belt in a width direction thereof;

a belt abnormality judging section to judge whether the endless belt is in an abnormal position or not based on a detection result obtained by the belt position detection section and one of judgment values which are set correspondingly to the pressure contact/separating state of the endless belt;

a belt drive control section to control a drive of the endless belt based on a judgment result obtained by the belt abnormality judging section; and a fixing roller to be brought into pressure contact with the endless belt.

8. The image forming apparatus according to claim 7, wherein the belt abnormality judging section increases an abnormality detection quantity to an upper limit according to an input time of an abnormal position detection signal output from the belt position detection section, the abnormal position detection signal indicating that the endless belt is in the abnormal position, and the belt abnormality judging section decreases the abnormality detection quantity to a lower limit according to an input time of a normal position detection signal output from the belt position detection section, the normal position detection signal indicating that the endless belt is in the normal position, and the belt abnormality judging section judges whether the endless belt is in the abnormal position or not by comparing the abnormality detection quantity with one of the judgment values.

9. The image forming apparatus according to claim 8, wherein the judgment values include a first abnormality judgment value and a second abnormality judgment value lower than the first abnormality judgment value;

the belt abnormality judging section judges that the endless belt has entered the abnormal position from the normal position when the abnormality detection quantity exceeds the first abnormality judgment value in the pressure contact state; and the belt abnormality judging section judges that the endless belt has entered the abnormal position from the normal position when the abnormality detection quantity exceeds the second abnormality judgment value in the separating state.

10. The image forming apparatus according to claim 9, wherein the judgment values include a first normality judgment value and a second normality judgment value lower than the first normality judgment value;

the belt abnormality judging section judges that the endless belt has returned from the abnormal position to the normal position when the abnormality detection quantity becomes lower than the first normality judgment value in the pressure contact state; and the belt abnormality judging section judges that the endless belt has returned from the abnormal position to the normal position when the abnormality detection quantity becomes lower than the second normality judgment value in the separating state.

11. The image forming apparatus according to claim 10, wherein an increase speed and a decrease speed of the abnormality detection quantity are set so that a time necessary for the abnormality detection quantity to reach the first abnormality judgment value from the lower limit by a monotonic increase is longer than a time necessary for the abnormality detection quantity to reach the first normality judgment value from the upper limit by a monotonic decrease; and a time necessary for the abnormality detection quantity to reach the second abnormality judgment value from the lower limit by the monotonic increase is longer than a time necessary for the abnormality detection quantity to reach the second normality judgment value from the upper limit by the monotonic decrease.

12. The image forming apparatus according to claim 7, further comprising a steering control section to amend meandering of the endless belt based on the detection result obtained by the belt position detection section.

* * * * *